United States Patent [19]

Matsui

[11] Patent Number: 4,979,827
[45] Date of Patent: Dec. 25, 1990

[54] OPTICAL LINEAR ENCODER
[75] Inventor: Keiji Matsui, Ooguchi, Japan
[73] Assignee: Kabushiki Kaisha Okuma Tekkosho, Nagoya, Japan
[21] Appl. No.: 313,606
[22] Filed: Feb. 22, 1989
[30] Foreign Application Priority Data
Feb. 26, 1988 [JP] Japan ................................. 63-43402
Jun. 30, 1988 [JP] Japan ................................. 63-163052
[51] Int. Cl.$^5$ .............................................. G01B 9/02
[52] U.S. Cl. ................................ 356/356; 250/237 G; 356/374
[58] Field of Search ....................... 356/355, 356, 374; 250/237 G

[56] References Cited
U.S. PATENT DOCUMENTS
4,278,273 10/1988 Michel ................................ 356/374
4,776,701 10/1988 Pettigrew ........................... 356/356

Primary Examiner—Davis L. Willis
Assistant Examiner—Matthew W. Koren
Attorney, Agent, or Firm—Wenderoth, Lind & Ponack

[57] ABSTRACT

An averaged diffraction moire position detector has a pair of diffraction gratings. One of the gratings has two grating portions arranged with an offset of half a pitch of the transit portions and the non-transit portions for light. The intensities of light passing through respective grating portions are added to cancel any error component is displacement signals produced when two parts of, for example, a machine tool move. Another averaged diffraction moire position detector uses offset in phase of respective error components contained in the diffracted light of plus and minus of the same number-order. Thus, the intensities of respective diffracted light are added to cancel respective error components, resulting in correct displacement signals being produced.

10 Claims, 7 Drawing Sheets

OPTICAL LINEAR ENCODER

BACKGROUND OF THE INVENTION

This invention relates to an optical linear encoder used for a position measurement in a machine tool and the like and, in particular, to a position detector using moire fringes produced through a set of diffraction gratings.

Nowadays, a length or distance measurement method using moire fringes produced by a pair of diffraction gratings has been used widely, since moire fringes are sensitive to any change of lateral movement and are capable of measuring displacements by fine steps. A pair of diffraction gratings (hereinafter referred to as a first grating and a second grating) are attached to two members or parts of the machine tool, which parts move relative to each other, so that it has been necessary to always keep a distance or gap between the pair of diffraction gratings. While, as the pitch of each of the diffraction gratings is made small in order to improve the resolution or resolving power of the length measurement, the influence of the of light diffraction effect becomes large. Consequently, a shadow of the first grating on the second grating is made thin and it is therefore impossible to obtain direct moire fringes with a high visibility. In order to solve the shortcoming of the prior art, Fourier images have been used to obtain diffraction moire fringes. Fourier images refer to a distribution of dark and bright portions due to light shading. When the first grating has parallel light beams having uniform phase or coherence impinging thereon, a light shading or distribution having the same pitch as that of the first grating is obtained at the positions determined by intergral-number-multiplying the distance which is fixed by dividing twice the grating pitch P squared by a divisor equal to a wavelength of the light beams. (At the mid-positions of the positions noted above, that is, positions determined by multiplying by an integer divided by two the distance noted above, a light shading having a reversed relationship of dark and bright portions is attained.)

When the second grating is placed at the position where the Fourier image is produced and the two gratings move laterally and relatively, the diffracted light passing through the second grating shows a clear contrast of a period P, which is called a diffraction moire pattern. Recently this principle has been considered for use in short distance measurement, such as in a mask-alignment step of a fine semiconductor manufacturing process (see, for example, J. VAC. SCI. TECHNOL. 15 (1987), pp 984 and J. V. VAC. SCI. TECHNOL. B1 (1983), pp 1276).

When the distance to be measured is made long and the grating pitch P made short in order to raise the accuracy in a distance measurement, it is difficult to surely hold two diffraction gratings having longitudinal separated positions of a distance $2P^2/\lambda$ enabling the production of a Fourier image, since the distance is abruptly shortened in proportion to the squared grating pitch P. When the distance or gap between the diffraction gratings changes or shifts from that enabling the production of a Fourier image, the intensity of diffracted light greatly changes, resulting in an impossibility of the positioning of the members of a machine tool. For example, presuming a diffraction grating pitch P is 1 $\mu$m and a light beam having a wavelength $\lambda$ of 0.633 $\mu$m is used, a change of the distance or gap G of the diffraction grating must be restricted within a sufficiently small range relative to 1.6 $\mu$m giving a Fresnel number $(\lambda \cdot G)/P^2 = 2$, which is obtained by dividing the product of the gap G of the diffraction gratings and the light wavelength $\lambda$ by a divisor equal to the diffraction grating's pitch P squared. That is the reason why diffraction moire fringes can not be used to finely measure or determine any distance between two members of generally used machine tools.

Under the circumstances, Japanese Laid-Open Patent Application No. 61-17016 of the applicant of the present application discloses a position detector for precisely determining any position, which determination is attained by a diffraction moire pattern not influenced by a change of the gap between the first grating and the second grating and sensitive to lateral displacement of these gratings.

According to the prior art, at every portion of the effective confrontation area between the first grating and the second grating, the light path or passage distance of the gap formed between the gratings changes to obtain a signal using a photodetector corresponding to the mean value of the diffracted moire signals. The correct position is detected by using the change in the signals of a period corresponding to that half the pitch P of the diffraction gratings, which change is seen in the mean value.

FIG. 1 to FIG. 3, respectively shows each example of the averaged diffraction moire position detector mentioned above. The operation of the position detector when a zero-order diffraction laser beam is used therein will be described.

In the mechanism shown in FIG. 1, the first grating 1 has a laser beam LB shown on the left impinging thereon. It is noted that the second grating 2 placed at the rear of the first grating 1 has a stepped transparent plate 3 attached to the second grating 2. The stepped transparent plate 3 is made of a high refractive index material selected so that the optical range of the gap G is between $G_o$ and $G_o + 2P^2/\lambda$. The stepped transparent plate 3 gives light path distance differences to each part of the laser beam LB. The stepped transparent plate 3 of FIG. 1 has five steps, thereby dividing the range of the optical distance $2P^2/\lambda$ into five parts. The lens group 4 serially arranged at a position behind the second grating 2 converges respective laser beams passing through respective five regions of the second grating 2, which regions have different optical distances.

Respective laser beams converged by each lens of the lens group 4 are respectively detected by means of a set of photodetectors 5. An adder 7 constructed of an operational amplifier and its related parts adds the signals from the photodetectors 5 to obtain displacement signals.

In the case shown in FIG. 2, the first grating 1 and the second grating 2 are placed in parallel, the later having a random light path difference plate 9 attached thereto or formed integrally therewith. The random light path difference plate 9 is made of a transparent material having a concavo-convex surface. The concavo-convex surface randomly determines the different light path distances of each part of the laser beam LB within the range of $2P^2/\lambda$. Respective parts of the laser beam LB converge to the diffusion plate 10 through the lens group 4. The focus points of the laser beam passing through each lens of the lens group 4 are placed on the diffusion plate 10 in a vertical line. That is, each part of light beam focussed or converged becomes incoherent by the diffusion plate 10. Laser beams diffused by the diffusion plate 10 pass through a convex lens 11 and a photodetector 12 such as a photodiode and the like detects the laser beam as shown in FIG. 2. Because the diffusion plate 10 is used and respective laser beams travel through different gap distances or different light path distances, these laser beams are averaged without mutual interference.

FIG. 3 shows another conventional case, in which the first grating 1 is placed vertically with respect to the incident direction of the laser beam LB and the second grating 2 is slanted with respect to the first grating 1. The gap distance of the effective confronting area between the gratings 1 and 2 is controlled so as to contain the range of $2P^2/\lambda$. Consequently, only zero-order diffracted light or the beam $L_o$ of the laser beam passing through the first and the second diffraction gratings 1 and 2 strikes a light receiving face of a photodetector 13 and is detected.

FIG. 4 is a perspective view similar to that of FIG. 3 of an example of an averaged diffraction moire position detector using second order diffracted light, in which the gap between the gratings 1 and 2 is controlled so as to contain the distances obtained by multiplying $P^2/4\lambda$. If the second order diffracted light is used, the shading produced when zero-order diffracted light is used is formed at a position determined by multiplying $P^2/4\lambda$, and this second order diffracted light position differs from that when zero-order diffracted light is used. It is suitable to average the gap light path distances which are obtained by dividing the other gap light path distance of $2P^2/\lambda$ to be averaged when zero-order diffracted light is used by eight. By the way, if second order diffracted light is used, even through it is controlled to contain the range of $2P^2/\lambda$ which is identical with that when zero-order diffracted light is used, the condition of the averaged gap light path distance obtained when second order diffracted light is used is attained, since the distance corresponds to $P^2/4\lambda$ multiplied by a whole number. It is understood that if a second order diffracted light (included other number-order diffracted ones) is used in a similar optical system, it is possible to precisely detect the position without any influence of change in the gap between the first and the second gratings, to the result of measurement, similarly to the case when zero-order diffracted light is used.

According to the various conventional averaged diffraction moire position detectors mentioned above, a light intensity I changes according to a relative displacement X of respective gratings as shown in FIG. 5 and it is possible to obtain a displacement signal having a period which is half the pitch P of the gratings without any influence of change in the gap distance between the first and the second gratings to the measurement result. The displacement signal can be approximately expressed by the following equation (1).

$$I(x) = A \cdot \cos(2\pi \cdot 2x/P) + B \quad (1)$$

wherein
 A: amplitude
 B: offset component

However, if any difference occurs between the gap light path distances to be averaged while an actual assembling procedure and an operation thereof, and another light path distance actually averaged, or if some installation conditions have any error, the displacement signal obtained may contains some error components having a period of the pitch P of the grating and/or another error components of an odd number-order. Disadvantageously, when the displacement signal contains such error components, it becomes impossible to carry out a precise position detection, since repeatability or reproduceability of the displacement signal of a period P/2 can not be obtained.

SUMMARY OF THE INVENTION

The present invention has been invented in order to solve the shortcomings of the conventional optical linear encoder. Thus, it is the purpose of the present invention to provide an averaged diffraction moire position detector enabling one to obtain diffraction moire signals sensitive to the relative lateral displacement of diffraction gratings even though the gap between the gratings changes, enabling one to lessen the disadvantageous influence due to errors produced during an actual assembling process and operations, and enabling to precisely detect the positions of the parts, for example, of a machine tool and a structure.

According to one aspect of this invention, for achieving the objects described above, there is provided an averaged diffraction moire position detector consisting of a first diffraction grating, a second diffraction grating displaceable laterally relative to said first diffraction grating, a means place between the gratings in order to change the gap light passage distance between parts of the effective confronting areas of said two diffraction gratings within the range of the light passage corresponding or equal to twice the Fresnel number or the product of 2 multiplied by integer, a means for obtaining signals corresponding to the averaged values of diffraction moire signals with reference to respective parts of the effective confronting areas of said two diffraction gratings, wherein using changes in signals of a period equal to half the pitch of said diffraction gratings, such changes appearing in said averaged values, lateral and relative displacements of said diffraction gratings are detected with a high precision, the improvement comprising two grating portions formed on said second diffraction grating so as to be shifted or offset by half the pitch of the gratings.

According to another aspect of this invention, there is provided an averaged diffraction moire position detector consisting of a first diffraction grating, a second diffraction grating displaceable laterally relative to said first diffraction grating, a means placed between the gratings in order to change the gap light passage distance between parts of the effective confronting areas of said two diffraction gratings within the range of the light passage corresponding or equal to twice the Fresnel number or the product of 2 multiplied by an integer, a means for obtaining signals corresponding to the averaged values of diffraction moire signals with reference to respective parts of the effective confronting areas of said two diffraction gratings, wherein using changes in signals of a period equal to half the pitch of said diffraction gratings, such changes appearing in said averaged values, lateral and relative displacements of said diffraction gratings are detected with a high precision, the improvement wherein said means for obtaining signals corresponding to the averaged values of diffraction moire signals consists of an adder for adding respective volumes of respective light of plus and minus of the same number-order of the light diffracted in plural number-orders when they pass through the two diffraction gratings, or electrical signals proportional to the respective volumes of said respective light of plus and minus of the same number-order.

The nature, principle and utility of the invention will become more apparent from the following detailed description when read in conjunction with the accompanying drawings.

DESCRIPTION OF THE PREFERRED EMBODIMENTS

Figure 1:
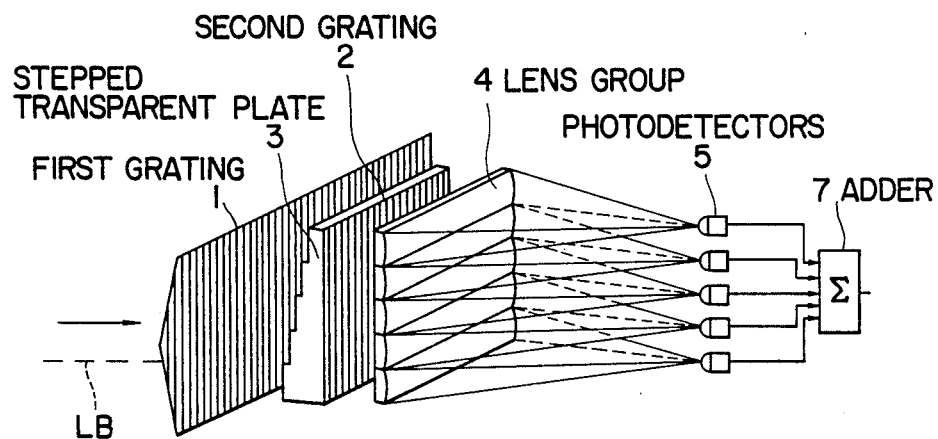
FIG. 1 to FIG. 4 are perspective views showing examples of conventional averaged diffraction moire position detectors.
Figure 6:
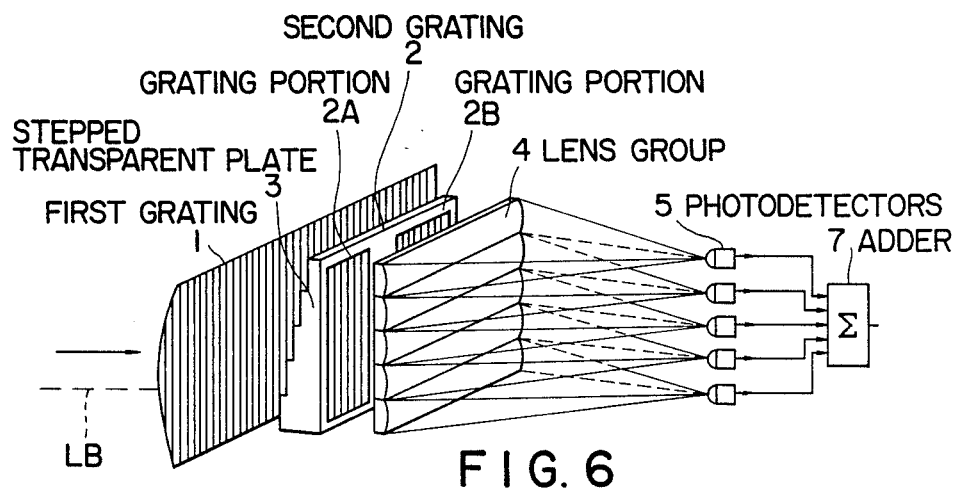
FIG. 6 is a perspective view showing a first embodiment of an averaged diffraction moire position detector in accordance with the present invention.
Figure 7:
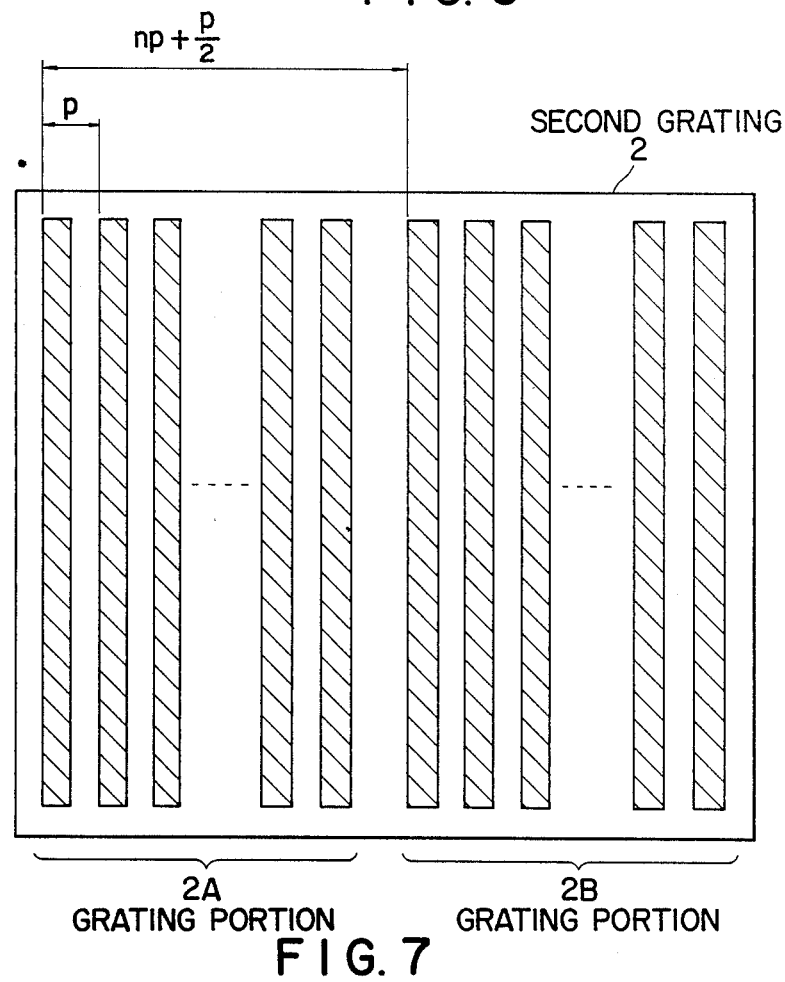
FIG. 7 is an example of a diffraction grating used in the position detector of FIG. 6.

FIG. 6 shows a perspective view of a first embodiment of an averaged diffraction moire position detector according to the present invention in correspondence to that of FIG. 1 and the same reference numerals and characters in FIG. 1 designate like or corresponding parts in FIG. 6. On a face of the second grating 2 of the averaged diffraction moire position detector of the first embodiment as shown in FIG. 7, there are two grating portions 2A and 2B, respectively consist of transit parts (hatching) and non-transit parts which are placed repeatedly and alternately with a pitch P of several μm-several hundred μm. These grating portions 2A and 2B are placed adjacently and in parallel with the displacement direction of the second grating 2. These grating portions 2A and 2B are offset by P/2 in their phase, so that when the transit part of the grating portion 2A confronts the transit part of the first grating 1, the transit part of the grating portion 2B confronts the non-transit part of the first grating 1.

Figure 12A:
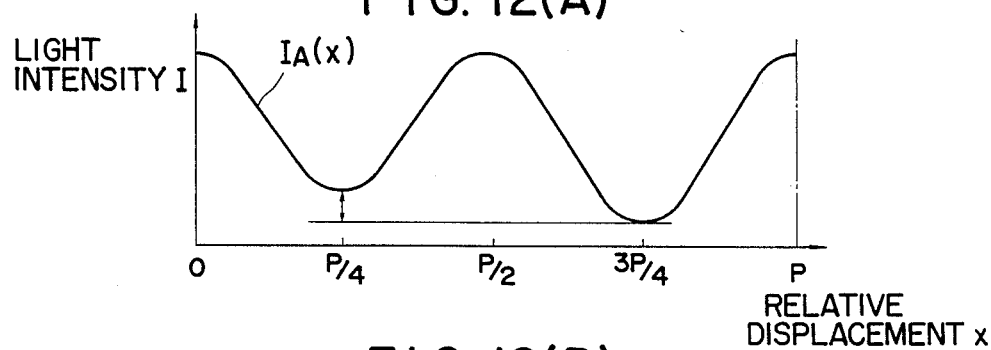
FIGS. 12 (A)-(C) are characteristic curve diagrams showing output waveforms of the first and the second embodiments of the present invention.
Figure 12B:
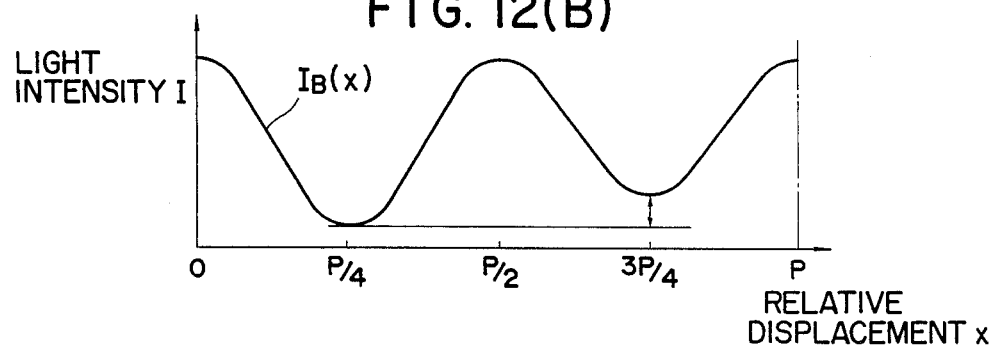
Figure 12C:
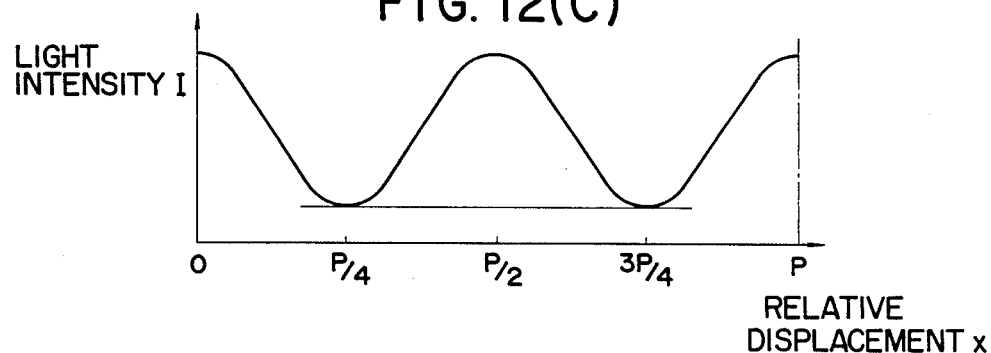

Using the construction above, when the displacement signal contains an error component, light intensity of the laser beam passing through, for example, the grating portion 2A changes, so that the shape of wave of a displacement signal $I_A(x)$ changes as shown in FIG. 12 (A) and expressed below.

$$I_A(x) = a \cos(2\pi x/P) + A \cos(2\pi \cdot 2x/P) + B \quad (2)$$

wherein, a is an amplitude of the error component having a period P.

In fact, because the grating portion 2B is offset from the other grating portion 2A by only P/2 in phase, a waveform of the displacement signal $I_B(x)$ of a change of the light intensity of laser beam passing through the grating portion 2B is as shown in FIG. 12 (B) and described below.

$$\begin{aligned} I_B(x) &= a \cos\{2\pi(x/P - \tfrac{1}{2})\} + A \cos\{2\pi(2x/P - \tfrac{1}{2})\} + B \\ &= -a \cos(2\pi x/P) + A \cos(2\pi \cdot 2x/P) + B \end{aligned} \quad (3)$$

Consequently, it is preferable to make the grating portion 2A identical with another grating portion 2B in their area and arrange them so as to make the same intensity of laser beam pass therethrough. The laser through respective grating portions 2A and 2B are simultaneously changed in photo-electricity conversion principle. The respective intensity of light are added together, resulting in the cancelling of the error components of a period P and obtaining consequently a precise or correct displacement signal having a period P/2 as shown in FIG. 12 (C).

Figure 2:
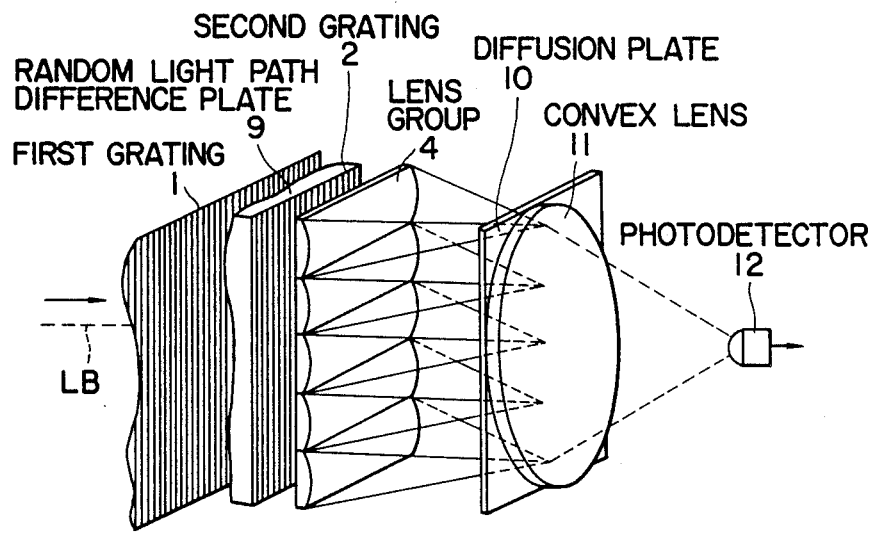
Figure 3:
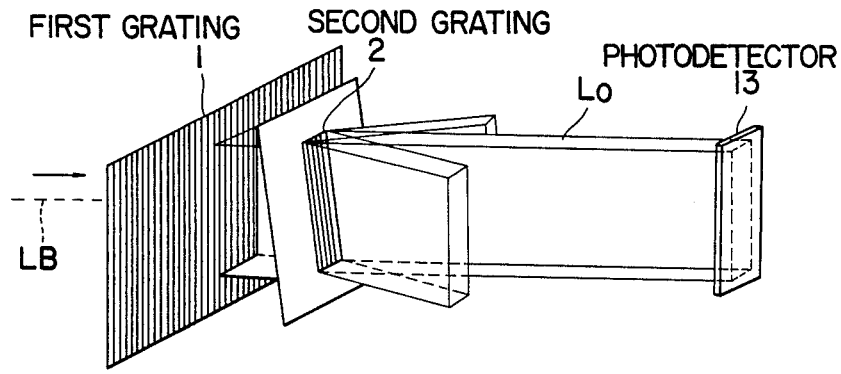
Figure 4:
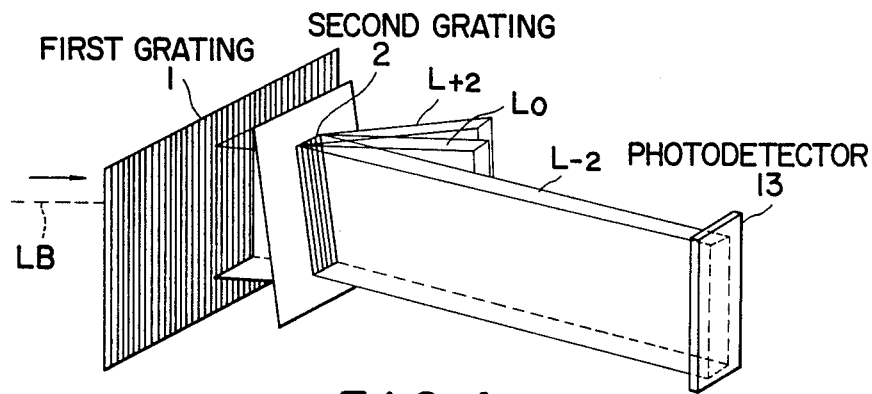
Figure 5:
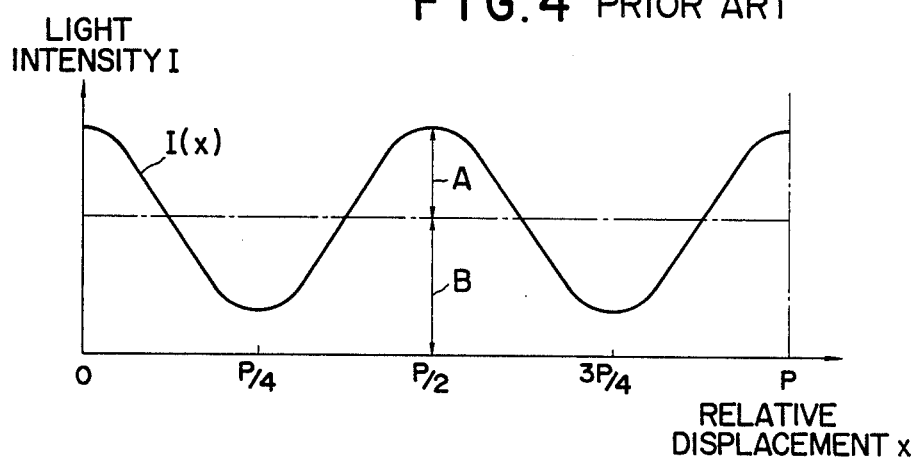
FIG. 5 is a characteristic curve diagram showing an output waveform of a conventional averaged diffraction moire position detector.
Figure 8:
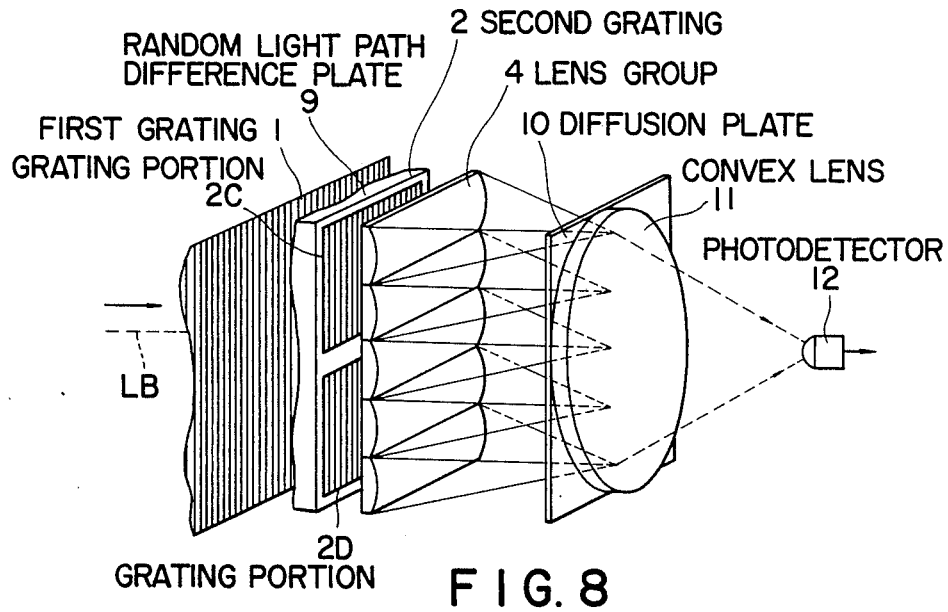
FIG. 8 is a perspective view showing a second embodiment of an averaged diffraction moire position detector in accordance with the present invention.
Figure 9:
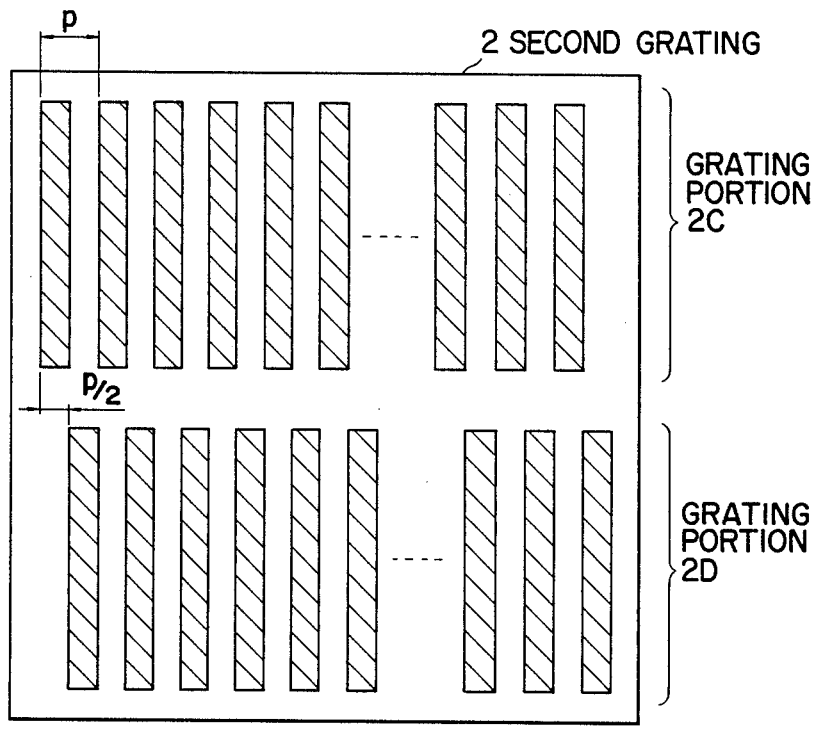
FIG. 9 is an example of a diffraction grating used in the detector of FIG. 8.

FIG. 8 is a perspective view of a second embodiment of an averaged diffraction moire position detector according to the present invention in comparison with that of FIG. 2. Referring to the drawings of FIGS. 2 and 8, like reference numerals designate the corresponding parts shown in respective views. There are two grating portions 2C and 2D on a surface of the second grating 2 of the averaged diffraction moire position detector as shown in FIG. 8. The grating portions 2C and 2D, respectively consist of several transit portions (hatching) repeatedly arranged with a pitch P of several μm to several hundred μm and several non-transit portions surrounding the transit portions and being alternately arranged with the pitch P. These grating portions 2C and 2D are placed adjacently along the directions of the transit portions as shown in FIG. 9, which directions are perpendicular to the displacement direction of the second grating 2, with a shifting of P/2. The effect of the construction of the second embodiment is identical with that of the first embodiment and the reason for the identification above was described above with reference to the first embodiment of the present invention.

According to these averaged diffraction moire position detectors of the first and the second embodiments of the present invention, it is possible to delete any error component having a period P, as well as other error components having periods of P/3, P/5, P/7, and etc. from the measurement results.

It is possible to change the constructions of these position detectors by installing one photodetector to receive several laser beams passing through respective grating portions, obtaining an increased effect by adding, or by installing an electrical means for adding the values of outputs of discrete photodetectors. In the latter case, it becomes more effective when an electrial mechanism for controlling the ratio of the light intensity to be added (for example, an adding ratio control means installed in front of an adder means) or an optical mechanism (for example, movable shields as shown in FIG. 7 installed between respective grating portions and the lens group) is employed. Although a zero-order diffraction light is used in respective embodiments above, it is possible to employ other diffraction light.

Figure 10:
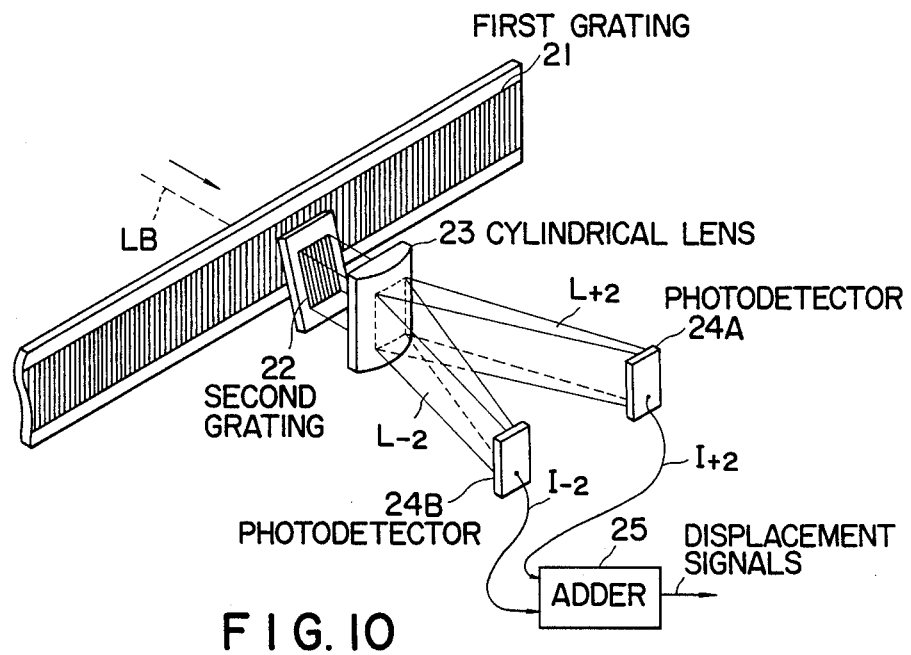
FIG. 10 is a perspective view showing a third embodiment of an averaged diffraction moire position detector in accordance with the present invention.

FIG. 10 is a perspective view of a third embodiment of an averaged diffraction moire detector according to the present invention, in which a secondary diffraction light is used.

In the third embodiment of the present invention, a first grating 21 is placed perpendicular to the laser beam LB and a second grating 22 is situated slantly to the first grating 21. The multi-diffracted laser beams passed through the first grating 21 and second grating 22 are converged at a cylindrical lens 23 placed behind the second grating 22. FIG. 10 shows only the minus and plus second order diffracted light $L\pm_2$. The converged second order diffracted lights $L_{+2}$ and $L_{-2}$ are detected by means of the photodetectors 24A and 25B to convert them into electrical signals in proportion to the light intensity. Respective converted electrical signals $I_{+2}$ and $I_{-2}$ are added in the adder 25, obtaining displacement signals.

Figure 13A:
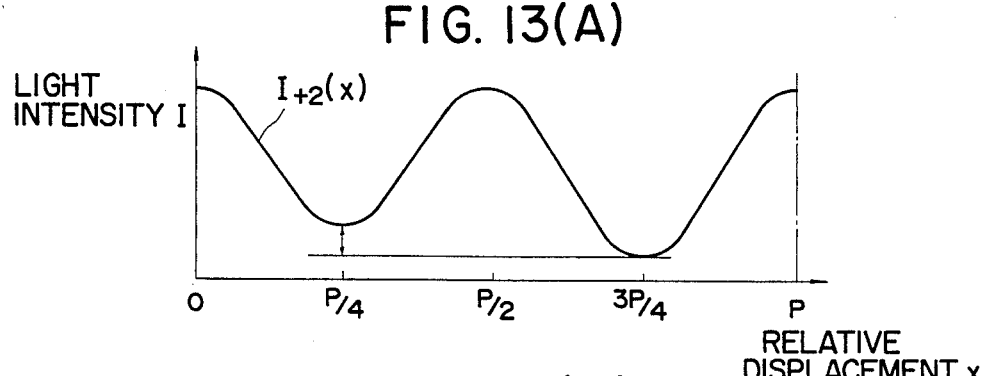
FIGS. 13 (A)-(C) are characteristic curve diagrams showing output waveforms of the third and the fourth embodiments of the present invention.
Figure 13B:
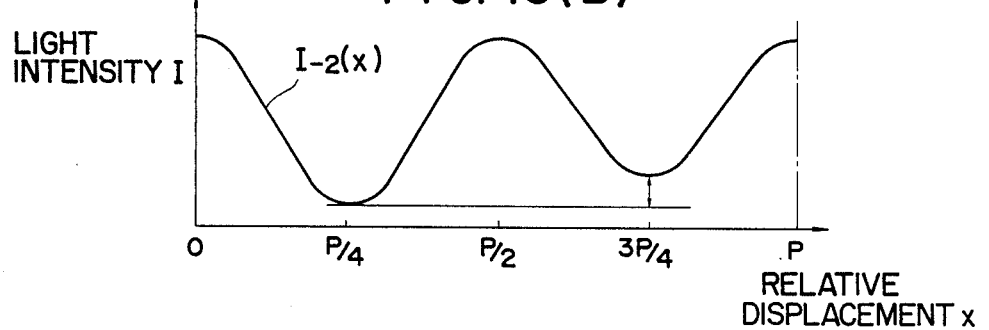
Figure 13C:
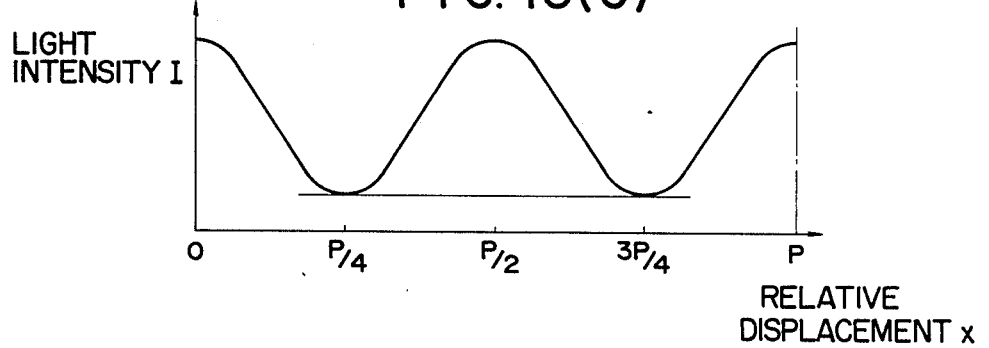

When an error component having a period which is identical with the pitch P of the diffraction grating is contained in the plus second order diffracted light $L_{+2}$ used in the third embodiment, a change in light intensity of the plus second order diffracted light $L_{+2}$ in a form of a displacement signal $I_{+2}(X)$ is shown as a waveform in FIG. 13 (A). This waveform is shown in the following equality.

$$I_{+2}(x) = a \cos(2\pi x/P) + A \cos(2\pi \cdot 2x/P) + B \quad (4)$$

wherein, a is an amplitude of an error component having a period P.

While, the change in light volume of the minus second order diffracted light $L_{-2}$ contains some error component having a period identical with the pitch P of the diffraction grating and the phase of the error component shifts by P/2 relative to the phase of the error component of the plus second order diffracted light $L_{+2}$. Consequently, a change in light intensity of the minus second order diffracted light $L_{-2}$ or a displacement signal $I_{-2}(X)$ is shown in a waveform as shown in FIG. 13 (B) and described by the following equality.

$$\begin{aligned}I_{-2}(x) &= a \cos\{2\pi(x/P - \tfrac{1}{2})\} + A \cos(2\pi \cdot 2x/P) + B \\ &= -a \cos(2\pi x/P) + A \cos(2\pi \cdot 2x/P) + B\end{aligned} \quad (5)$$

As a result, it is possible to obtain a correct displacement signal as seen in FIG. 13 (C) having a period P/2 after the error component having a period identical with the pitch P of the diffraction grating is offset by adding an electrical signal (displacement signal) $I_{+2}(X)$ proportional to a change in a light intensity of the plus second order diffracted light $L_{+2}$ to another electrical signal (displacement signal) $I_{+2}(X)$ proportional to a change in a light intensity of the minus second order diffracted light $L_{-2}$.

Figure 11:
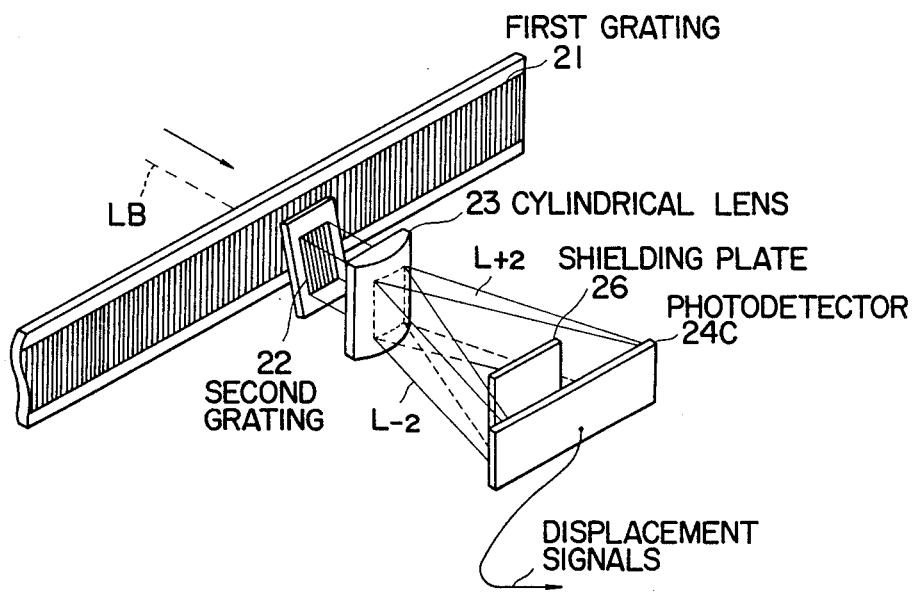
FIG. 11 is a perspective view showing a fourth embodiment of an averaged diffraction moire position detector in accordance the present invention.

FIG. 11 shows a fourth embodiment of an averaged diffraction moire position detector to the present invention and corresponds to FIG. 10, like reference numerals designate similar parts in perspective views. In the fourth embodiment of the present invention, the zero-order diffracted light and a plus minus first order diffracted light of various number-order diffracted lights converged through the cylindrical lens 23 are shielded by a shielding plate 26, and only the plus and minus second order diffracted light $L\pm_2$ are detected by a photodetector 24C situated behind the shielding plate 26. These diffracted light $L\pm_2$ are simultaneously converted to an electrical signal. It corresponds to an addition of two electrical signals as mentioned above, and thus the effect of the fourth embodiment is identical with that of the embodiments previously described.

Although the plus second order diffracted light beams are used in respective embodiments, it is possible to use other diffracted light beams of plus and minus of the same number-order.

According to the averaged diffracted moire position detector according to the present invention, it is possible to precisely detect the positions being detected of any error components. Comparing to the conventional position detector for detecting positions by using a volume of the light of a minus diffracted light or a plus diffracted light, the position detector of the present invention can carry out a position detection by means of twice light intensity of the diffracted laser beam, in which the error components are cancelled, resulting in a precise detection of positions, such as of the members of machine tools and resulting in an efficent manufacturing of products.

It should be understood that many modifications and adaptations of the invention will become apparent to those skilled in the art and it is intended to encompass such obvious modifications and changes in the scope of the claims appended hereto.

What is claimed is:

1. In an averaged diffraction moire position detector comprising: a first diffraction grating; a second diffraction grating displaceable laterally relative to said first diffraction grating; a means disposed between said first and second diffraction gratings for changing a gap light passage distance between parts of the effective confronting areas of said first and second diffraction gratings within a range of light passage distances corresponding or equal to twice a Fresnel number or the product of 2 multiplied by an integer; a means for obtaining signals corresponding to the averaged values of diffraction moire signals with reference to respective parts of the effective confronting areas of said two diffraction gratings, wherein using changes in signals of a period equal to half the pitch of said diffraction gratings, wherein such changes appear in said averaged values, lateral and relative displacements of said diffraction gratings are detected with a high precision, the improvement comprising two grating portions being formed on said second diffraction grating, one of said grating portions being shifted or offset from the other of said two grating portions by half the pitch of said gratings.

2. The averaged diffraction moire position detector according to claim 1, wherein said two grating portions are arranged so as to be adjacent to each other along the relative displacement direction of said first and second diffraction gratings.

3. The averaged diffraction moire position detector according to claim 1, wherein said two gratings are arranged so as to be adjacent to each other along a direction perpendicular to the relative displacement direction of said first and second diffraction gratings.

4. The averaged diffraction moire position detector according to claim 1, wherein said means for obtaining signals corresponding to the averged values of diffraction moire signals comprises an adder for adding respective intensities of light passing through said two grating portions or for adding electrical signals proportional to said respective intensities of light passing through said two grating portions.

5. The averaged diffraction moire position detector according to claim 4, wherein said adder is adapted to photo-electrically convert the light beams passing through said two grating portions into an electrical signal corresponding thereto.

6. The averaged diffraction moire position detector according to claim 4, wherein said adder is adapted to electrically add the light beams passing through said two grating portions after the light beams are photo-electrically converted individually into electrical signals corresponding there to.

7. The averaged diffraction moire position detector according to claim 6, further including a control means for controlling said adder so as to control the relative proportion between the electrical signals corresponding to the intensities of the light passing through said two grating portions.

8. In an averaged diffraction moire position detector comprising: a first diffraction grating; a second diffraction grating displaceable laterally relative to said first diffraction grating; a means placed between said first and second diffraction gratings for changing a gap light passage distance between parts of the effective confronting areas of said two diffraction gratings within a range of light passage distances corresponding to or equal to twice a Fresnel number or the product of 2 multiplied by an integer; a means for obtaining signals corresponding to the averaged values of diffraction moire signals with reference to respective parts of the effective confronting areas of said two diffraction gratings, wherein using changes in signals of a period equal to half the pitch of said diffraction gratings, wherein such changes appear in said averaged values, lateral and relative displacements of said diffraction gratings are detected with a high precision, the improvement wherein said means for obtaining signals corresponding to the averaged values of diffraction moire signals comprises an adder for adding respective volumes of respective light beams of plus and minus of the same number-order of these light beams diffracted in plural number-orders when they pass through said first and second diffraction gratings, or for adding electrical signals which are proportional to the respective volumes of said respective light beams of plus and minus of the same number-order.

9. The averaged diffraction moire position detector according to claim 8, wherein said adder is adapted to photo-electrically convert both the diffracted light beams of plus and minus of the same number-order.

10. The averaged diffraction moire position detector according to claim 8, wherein said adder is adapted to electrically add the diffracted light beams of plus and minus of the same number-order after the diffracted light beams are individually photo-electrically converted.

* * * * *